UNITED STATES PATENT OFFICE.

EDGAR EVERHART, OF HOBOKEN, NEW JERSEY.

COMPOSITION FOR INSULATING TELEGRAPH-WIRES, COATING METALS, COVERING ROOFS, AND FOR OTHER PURPOSES.

SPECIFICATION forming part of Letters Patent No. 227,352, dated May 11, 1880.

Application filed February 5, 1880.

*To all whom it may concern:*

Be it known that I, EDGAR EVERHART, of Hoboken, in the county of Hudson and State of New Jersey, have invented certain new and useful Improvements in Compositions for Insulating Telegraph-Wires, Coating Metals, Covering Roofs, and for other Purposes, which consists of a compound for the purpose of coating telegraph, telephone, and other insulators to form a non-conducting surface, and for the purpose of preventing iron and other metals from rusting, and of forming an impenetrable and indestructible coating for roofs, pipes, &c., as well as for the purpose of preserving wood, paper, duck, muslin, and other textile fabrics from decay and mildew and influence of the atmosphere and moisture, of which the following is a full and complete description.

The nature of this improvement relates to the coating or covering of iron, metals, wood, paper, duck, muslin, and other textile fabrics with a compound or mixture consisting of a resin or lac, asphalt, or coal-tar or pitch, powdered charcoal, and infusorial earth, or their equivalents, in or about in the following proportions, and in the manner hereinafter described.

It is well known that insulators covered with the ordinary insulating compounds are soon rendered valueless on account of the destruction and disintegration of the insulating compound, and that wood, metals, paper, duck, muslin, and other textile fabrics are also subject to the same disadvantages when so coated.

The object of this compound is to furnish such a covering as will preserve the above-mentioned and other kindred substances and materials and fabrics for an indefinite number of years from the destructive influence of the atmosphere and moisture, and as will preserve a perfect insulation for telegraph, telephone, and others insulators of wood, metal, paper, &c.

The process of preparing said compound or mixture consists in melting, in an iron or other suitable vessel, about two hundred and fifty pounds of asphalt or its equivalent, and one hundred pounds resin. When these two substances are in a liquid state and thoroughly mixed, about twenty pounds each of finely-powdered charcoal and infusorial earth are gradually added, and the whole is thoroughly stirred and mixed. These proportions may be altered as circumstances demand. Into this molten mass the insulators or other articles are immersed for a few minutes, and are then removed and allowed to drain and cool. By this means a hard smooth coating covers the insulators or whatever other articles may have been immersed in or coated by other suitable means by the molten mass, and the same will be able to resist the destructive action of the atmosphere, moisture, &c.

A similar method of coating may be applied to metals, wood, paper, duck, muslin, and other textile fabrics; or the compound may be mixed with a suitable liquid and applied with a brush, like paint, the liquid, on evaporation, leaving the above-mentioned compound on the surface of the articles referred to.

The compound might also be prepared by substituting for the powdered charcoal powdered mineral coal, and for the infusorial earth powdered silica.

What I claim as my invention, and desire to secure by Letters Patent, is—

The composition of matter for insulating telegraph-wires, coating metals, covering roofs, and for other purposes, consisting of resin or lac, asphalt, coal-tar, or pitch, powdered charcoal, and infusorial earth or its described equivalent, substantially in the manner set forth.

EDGAR EVERHART.

Witnesses:
WM. T. MAGRUDER,
W. ERNEST H. JOBBINS.